(12) United States Patent
Nguyen (10) Patent No.: US 9,117,374 B2
(45) Date of Patent: Aug. 25, 2015

(54) AUTOMATICALLY GENERATING QUIZ QUESTIONS BASED ON DISPLAYED MEDIA CONTENT

(71) Applicant: Google Inc., Mountain View, CA (US)

(72) Inventor: Billy Nguyen, San Jose, CA (US)

(73) Assignee: GOOGLE INC., Mountain View, CA (US)

(*) Notice: Subject to any disclaimer, the term of this patent is extended or adjusted under 35 U.S.C. 154(b) by 29 days.

(21) Appl. No.: 13/623,060

(22) Filed: Sep. 19, 2012

(65) Prior Publication Data

US 2014/0080110 A1    Mar. 20, 2014

(51) Int. Cl.
*G09B 7/00* (2006.01)
*H04N 21/488* (2011.01)

(52) U.S. Cl.
CPC ............. *G09B 7/00* (2013.01); *H04N 21/488* (2013.01)

(58) Field of Classification Search
USPC .................................................. 434/362, 359
See application file for complete search history.

(56) References Cited

U.S. PATENT DOCUMENTS

| | | | |
|---|---|---|---|
| 2010/0138852 | A1 | 6/2010 | Hirsch et al. |
| 2010/0162343 | A1 | 6/2010 | Roberts et al. |
| 2011/0172499 | A1* | 7/2011 | Simons-Nikolova et al. 600/300 |
| 2011/0209189 | A1 | 8/2011 | Shah |
| 2012/0088222 | A1* | 4/2012 | Considine et al. ............ 434/362 |
| 2012/0258438 | A1* | 10/2012 | Cohen .......................... 434/365 |
| 2013/0243205 | A1* | 9/2013 | Wang ............................. 381/56 |

FOREIGN PATENT DOCUMENTS

| | | |
|---|---|---|
| KR | 10-0443076 | 8/2004 |
| KR | 2010-0025281 | 3/2010 |

OTHER PUBLICATIONS

Google Inc., International Search Report and Written Opinion, PCT/US2013/060711, Apr. 21, 2014, 7 pgs.

* cited by examiner

*Primary Examiner* — Sam Yao
*Assistant Examiner* — Michael Humphrey
(74) *Attorney, Agent, or Firm* — Morgan, Lewis & Bockius LLP (57) ABSTRACT

In accordance with some implementations, a method for automatically generating quiz questions is disclosed. The method is performed on a server system having one or more processors and memory storing one or more programs for execution by the one or more processors. The server system receives, from a client system, media information associated with media content displayed on a display associated with the client system. The server system then analyzes the received media information to determine one or more keywords associated with the media information. The server system retrieves one or more facts based on the one or more determined keywords. The server system then automatically generates a quiz question based on the one or more retrieved facts. The server system then transmits the generated quiz question to the client system for display.

18 Claims, 8 Drawing Sheets

AUTOMATICALLY GENERATING QUIZ QUESTIONS BASED ON DISPLAYED MEDIA CONTENT

TECHNICAL FIELD

The disclosed implementations relate to the field of media display generally and in particular to automatically generating interactive media content.

BACKGROUND

Media content providers have significant motivation to increase user interest and engagement with the media content they provide. Increased user engagement generally results in greater exposure for the media content. Greater exposure and user engagement results in increased revenue for the provider of that media content. User engagement can be increased by changing the content of the media to be more visually or intellectually appealing. Alternatively, user interest in media content can also be increased by changing the viewer experience without altering the content of the media content. For example, displaying the media content on a larger display, at a higher resolution, or in a three dimensional format. By increasing the visual appeal of the content user engagement may be increased.

Users generally find interactive content to be more engaging than passive or one direction media content. Media content providers therefore can increase user engagement with the content they produce by finding ways to make media content interactive. Video games, for example, are interactive and produce greater engagement with users than passive viewers of television programs. Trivia games are a popular type of interactive games that engage users and allow them to compete with other users or against themselves.

SUMMARY

In accordance with some implementations, a method for automatically generating quiz questions is disclosed. The method is performed on a server system having one or more processors and memory storing one or more programs for execution by the one or more processors. The server system receives, from a client system, media information associated with media content displayed on a display associated with the client system. The server system then analyzes the received media information to determine one or more keywords associated with the media information. The server system retrieves one or more facts based on the one or more determined keywords. The server system then automatically generates a quiz question based on the one or more retrieved facts. The server system then transmits the generated quiz question to the client system for display.

In accordance with some implementations, a server system for automatically generating quiz questions is disclosed. The server system includes one or more processors and memory storing one or more programs to be executed by the one or more processors. The one or more programs comprise instructions for receiving, from a client system, media information associated with media content displayed on a display associated with the client system. The one or more programs further include instructions for analyzing the received media information to determine one or more keywords associated with the media information. The one or more programs further include instructions for retrieving one or more facts based on the determined one or more keywords. The one or more programs further include instructions for automatically generating a quiz question based on the one or more retrieved facts. The one or more programs further include instructions for transmitting the generated quiz question to the client system for display.

In accordance with some implementations, a non-transitory computer readable storage medium storing one or more programs configured for execution by a server system. The one or more programs comprising instructions for receiving, from a client system, media information associated with media content displayed on a display associated with the client system. The one or more programs further comprising instructions for analyzing the received media information to determine one or more keywords associated with the media information. The one or more programs further include instructions which, when executed by the server system cause the server system to retrieve one or more facts based on the determined one or more keywords. The server system then automatically generates a quiz question based on the one or more retrieved facts. The server system then transmits the generated quiz question to the client system for display.

DESCRIPTION OF IMPLEMENTATIONS

Increasing user engagement with media content increases the probability a user will continue to view media content from a particular media content provider and thus results in increased revenue to the content provider. For example, the media content provider receives additional revenue because a user subscribes to receive additional media content from a premium cable channel or through additional advertisement sales. One strategy for increasing user engagement is to provide interactive features to the user. One such interactive feature is a trivia game that is displayed to one or more users of one or more client systems concurrently with media content displayed on the screen. The trivia questions themselves are automatically generated based on information related to the media content displayed on a client system. By only generating questions associated with the displayed media content the trivia game increases user engagement in the media content instead of distracting the user from becoming engaged with the displayed media content.

In some implementations, the questions are automatically generated by a server system located remotely from the client system that is displaying the media content. In some implementations the server system will receive information concerning the currently displayed piece of media from the client system. This information includes identification of the piece of media content and a description of the content of the piece of media content. Some implementations will also include the genre, plot points, cast list, and a closed captioned textual representation of all the spoken dialogue in the piece of media content. The server system analyzes the information received from the client system to determine specific keywords associated with the displayed content. For example, the server system may determine, based on the text associated with the dialogue in the media content, that the characters on a television show are discussing pineapples. Based on analyzing this text the server system may determine that "pineapple" is a currently relevant keyword.

In accordance with some implementations the server system uses the determined keywords to generate quiz questions related to the currently displayed media content. The server system uses the determined keyword to retrieve facts related to the keyword. For example, for a determined keyword of "pineapple," the server system retrieves the fact "The Philippines is the largest producer of pineapples in the world." In some implementations the facts are retrieved from a database of facts stored at the server system. In other implementations, the facts are retrieved from a third party database remote from the server system. In this case, the third party database is stored and maintained by a third party, unrelated to the organization that operates the server system. The server system then sends the determined keyword to the third party database and receives from the third party database, one or more facts associated with the keyword.

In accordance with some implementations, the server system uses the retrieved facts to automatically generate quiz questions. The server system analyzes the retrieved facts to determine what portion of the facts is most suitable to be used as an answer and what portion is most appropriate for creating a quiz question.

In some implementations the server system employs simple analysis methods, such as identifying proper nouns, numbers, measurement quantities, or more general nouns in the text of the fact to use as an answer for a quiz question. For example, a fact may be analyzed to identify a proper noun by comparing each word in the fact against a list of known proper nouns. The server system then determines the category of the answer and identifies reasonable alternatives. For example, when the server system analyzes the fact, "The Philippines is the largest producers of pineapples in the world" it may identify "Philippines" as a proper noun and select it as the answer to a quiz question. The server system then determines that "Philippines" is a country name. Based on this information, the server system is able to identify reasonable alternatives such as "Brazil," "Columbia", and "Sri Lanka." Reasonable alternatives may be determined from a database of categories such as countries, dates, animals, and fruits. Each category in the database would include a list of possible alternatives for answers that fall into that category.

In other implementations, the server system retrieves facts from a fact database in which the facts are already preprocessed, such that the fact itself indicates the portion of the facts that are suitable for answers to quiz questions and will include a list of reasonable alternatives from which the server system may choose. In some implementations, the server system then creates a quiz question by rephrasing the fact as a question and listing the original answer and the determined alternatives in a randomly determined order.

In some implementations, the server system transmits the created quiz questions to one or more client systems. In general, a created question can be transmitted to any client system currently viewing the media content to which the quiz question is related. For example, if the quiz question is based on a specific episode of the television program, "Community," the server system then is able to transmit the created quiz question to any client system currently displaying the same specific episode of the television program "Community" and participating in the quiz game. Thus, in some implementations, many client systems that are displaying the same media content at the same time (such as a broadcast television program) with at least one user participating in the quiz game will all display the same created quiz questions.

In accordance with some implementations a user in the vicinity of the client system that is displaying the generated questions received from the server system responds to the quiz question by transmitting an answer to the client device. The user's chosen answer can be transmitted to the client system via a number of well established methods such as a remote control device, a mobile phone with an appropriate application, or a controller for a video game system. The client system then transmits the user's selected answer to the server system.

In some implementations more than one user interacts with a particular client device and responds to displayed quiz questions. The client system receives answers from each user who is playing the quiz game and transmits those answers to the server system, either individually as they are received or as a group once answers from each user are received. In accordance with some implementations, each respective user of the quiz game may opt to allow the system to maintain a user profile for the respective user. The client system then maintains user profiles for each user currently playing the game that opts to allow it and records each answer given by the user. In some implementations users log into the server system to play the quiz game and the results of each play session are recorded in user profiles stored on the server system.

In accordance with some implementations, the server system receives user selected answers from at least one client device. The user selected answers are analyzed to generate a score. In some implementations, the score is generated by determining whether the answer selected by a particular user matches the correct answer (based on the fact used to automatically generate the quiz question.) In other implementations, a score is determined by determining whether answer selected is correct and determining how quickly the answer is selected by the user. A user who answers correctly quickly is awarded a higher score than a user who selects correct answer more slowly. In some implementations, the score also takes into account the order in which the answers are received, allocating the highest score to the user who submits the first correct answer and lower scores to users who submit correct scores subsequently.

In some implementations, the generated scores are sent to one or more client system, such that each respective client system receives at least the scores associated with the users in the vicinity of the respective client system. In accordance with some implementations the client systems display the scores received from the server system. In some implementations, more than one score is transmitted to the client system for display and the scores are ranked in order from the highest score to the lowest score. In some implementations, the server system transmits the scores associated with all users in the local client system environment for a particular client system for display on that particular client system. In this way, when multiple users in the same client system environment participate in the quiz game all the scores and relative ranks will be easily displayable and comparable on the client system. In some implementations the server system sends the scores of all users currently participating in the quiz game to a client system for display and thus allows users at a particular client system to compare their scores and ranking against the scores and rankings of all the other users participating in the quiz game.

Figure 1:
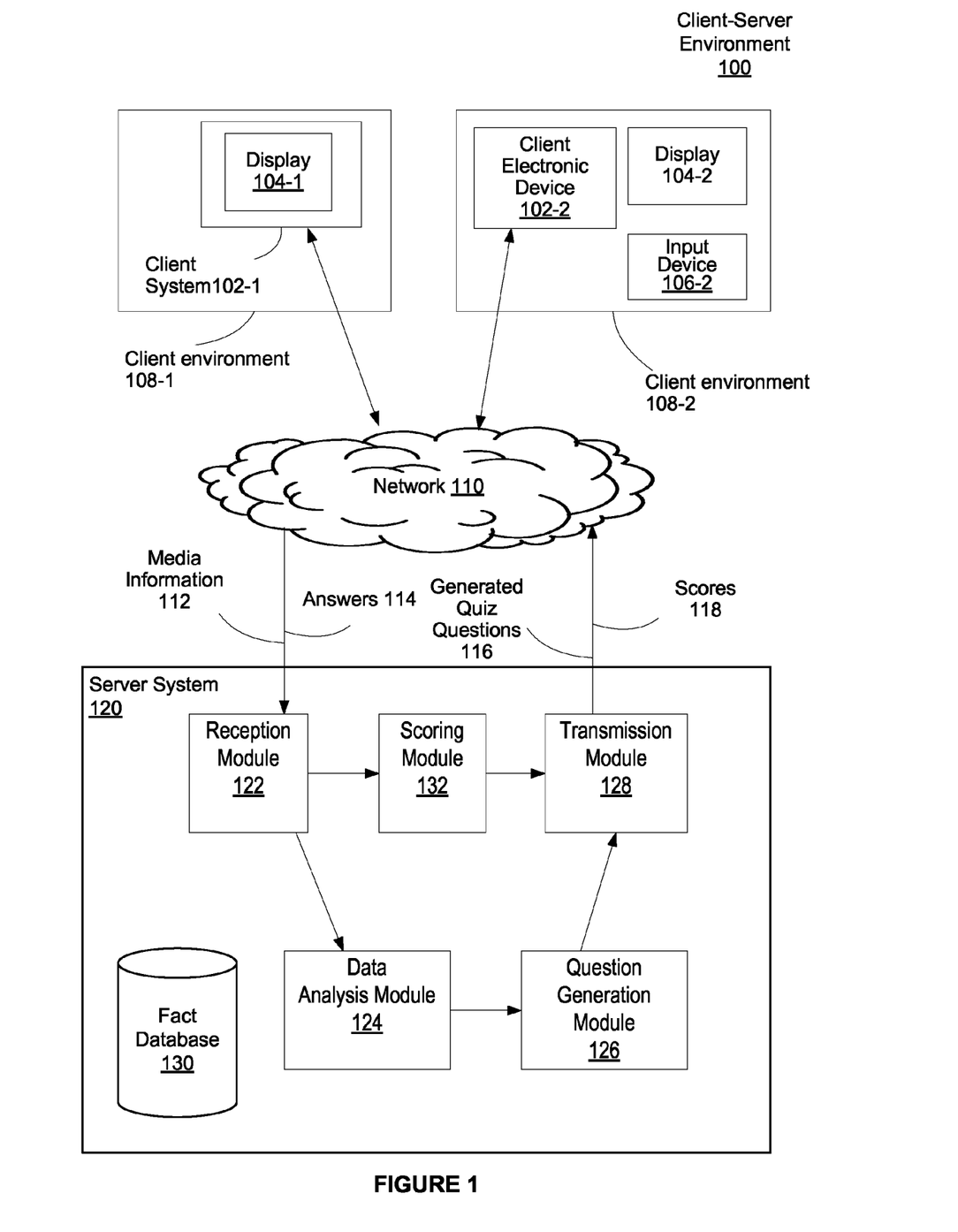
FIG. 1 is a block diagram illustrating a client-server environment in accordance with some implementations.

FIG. 1 is a block diagram illustrating a client-server environment 100 in accordance with some implementations. The client-server environment 100 includes a client system 102 which is part of a user environment 108 and a server system 120 which are connected through a network 110. In some implementations, the client system 102-1 includes a display 106-1. In some implementations, the user environment 108-2 includes an input device 104-2 and a display 106-2 associated with the client system 102-2 but not integrated into the client system 102-2. The input device 106-2 can be any device capable of receiving input from user and transmitting that input to the client system 102-2. For example, possible input devices include remote controls, a smart phone with an application which enables the user to submit data to the client system, a video game controller, or a tablet computer. The server system 120 includes a reception module 122, a data analysis module 124, a question generation module 126, a scoring module 128, a transmission module 130, and a fact database 132. The network 110 includes any of a variety of networks, including local area networks (LAN), wide area networks (WAN), wireless networks, wired networks, the Internet, or a combination of such networks.

In accordance with some implementations, a client environment 108-1 includes a client system 102-1. In some implementations, the client system 102-1 includes an incorporated display 104-1. In other implementations the client environment 108-2 includes a client system 102-2, a display 104-2, which is associated with the client system 102-2 but is not integrated into the client system 102-2, and an input device 106-2, which may be directly connected to the client system 102-2 or is not directly connected and communicates with the client system 102-2 through wireless transmission. The input device 106-2 is used to transmit input from a user to the client system 102-2. The associated display 104-2 is configured to display media in the vicinity of the user of the client system 102-2.

In accordance with some implementations, the client system 102 transmits media information 112 concerning the media currently being displayed on the display 104 to the server system 120. The media information 112 may include metadata for the displayed media, including the name of the piece of media content, genre information, cast information, theme or topic information, and information concerning specific scenes or events. In some implementations the media information 112 includes the text of all spoken or displayed content during a piece of media content. In accordance with some implementations, the client system 102 then receives generated quiz questions 116 from the server system 120. The client system 102 then displays the received generated quiz question 116 on the display 104 associated with the client system 102.

In some implementations, once the quiz question 116 has been displayed on the display 104 associated with the client system 102, any participating user in the client environment 108 is able to select an answer to the generated quiz questions 116 and transmit that answer 112 to the client system 102 through an input device 106. The client system 102 then transmits selected answers 112 from one or more users in the client environment 108 participating in the quiz game to the server system 120.

In some implementations the client system 102 receives scores 118 from the server system 120. In accordance with some implementations, the score 118 associated with a particular user represents whether the answer selected by the user was the correct answer, based on information stored at the server system 120. In other implementations, the score also represents how quickly the user responded to a particular question. For example, in some implementations a quiz question is displayed for 60 seconds on the display 104. If a user submits a correct answer in the first 30 seconds, they receive 10 points. If a user submits a correct answer after the first 30 seconds but before the quiz question is no longer displayed the user would receive 5 points. Users who submit an incorrect answer or submit an answer after the quiz question is no longer displayed receive no points.

In some implementations, the received scores 118 include a relative ranking of each participating user's cumulative score relative to the cumulative scores of at least some of the other users currently participating in the quiz game. Then the scores are displayed in order of cumulative score, the highest cumulative score displayed first or at the top and the lowest cumulative score being displayed last or at the bottom. In this way, users participating in the quiz game can easily judge their performance in the quiz game in relation to the performance of other users.

In accordance with some implementations, the server system 120 includes a reception module 122, a data analysis module 124, a question generation module 126, a transmission module 128, a fact database 130, and a scoring module 132. The reception module 122 receives communications from the network 110, including but not limited to media information 112 and user selected answers 114 from client systems 102. The reception module receives this information and sends it either to the data analysis module 124, in the case of media information 112, or the scoring module, in the case of user selected answers 114. The data analysis module 124 receives media information routed to it by the reception module 122. The data analysis module 124 analyzes the media information 112 it receives to determine specific keywords. In some implementations the keywords are nouns which relate to a topic relevant to media content currently being displayed on a display 104 currently in the proximity of the user. Once at least one keyword has been identified the data analysis module 124 retrieves a fact related to the identified keyword from a fact database 130. In some implementations the fact database 130 randomly chooses a fact from a list of facts associated with the determined keyword. The received fact is then sent to the question generation module 126.

In accordance with some implementations the question generation module 126 receives a fact from the data analysis module 124. The question generation module 126 uses the received fact to generate a quiz question. In some implementations, generating a quiz question involves several steps. The question generation module 126 determines the portion of the fact to use as the answer to the quiz question. In some implementations the fact itself is formatted so as to identify an appropriate topic to use as an answer a quiz question. For example, the received fact may be "Han Solo: the character played by Harrison Ford in the 1977 hit 'Star Wars.'" In this example the fact is formatted to identify "Han Solo" as an appropriate answer for the question. In other implementations, the question generation module 126 must analyze the fact to determine an appropriate answer for a new quiz question. The answer to the quiz question may be a proper noun, an otherwise distinctive non-proper noun, a date, a number, a unit of measurement, or another easily testable answer. For example, for the fact "Harrison Ford played Han Solo in the 1977 Hit 'Star Wars'" the quiz generation module 126 may select "Harrison Ford," "Han Solo," or "Star Wars", or the date 1977 as the answer and then build a quiz question that uses the selected section as the answer. For example, if the date 1977 is selected, a corresponding question would be "What year was the movie "Star Wars" first shown in theaters?" If the name "Harrison Ford" is selected a corresponding question would be "What is the name of the actor who played Han Solo in the 1977 movie 'Star Wars'?" In this way, several different questions can be generated from a single fact, depending on what portion of the fact is selected as the answer. In some implementations, the question generation module 126 determines all possible candidates that may be used as an answer to a quiz question and then randomly selects one of the determined possible candidates.

In some implementations the question generation module 126 includes heuristics that enable the question generation module 126 to determine, from a given fact, the portions of a fact that are appropriate topics for quiz questions. In some implementations, the question generation module first breaks the fact into several portions, each portion including a single word, a short phrase (e.g. a name or a title), a number, a date, or other grouping. For each respective portion of the fact, the question generation module 126 determines a category or type for the respective portion of the fact. For example, the respective portion "Sep. 15, 1978" would be identified as a date, and the word "banana" would be identified as a fruit. The question generation module 126 selects one of the respective portions as the answer for the quiz question based on the identified category of each portion.

In some implementations, the question generation module 126 then determines reasonable alternatives to the determined answer to the quiz question. For example, if the selected answer is a date, the question generation module 126 determines reasonable date alternatives. The question generation module 126 then places the answer and the determined alternatives in a randomized order. The question generation module 126 passes the generated quiz question to the transmission module 128.

In some implementations the transmission module 128 receives a generated question from the question generation module 126. The transmission module 128 then sends the generated question to the client system 102 for display. In some implementations the server system 120 includes a scoring module 132. When the reception module 122 receives user selected answers 114, the user selected answers 114 are sent to the scoring module 132. The scoring module 132 compares the user selected answers 114 to the correct answer stored by the server system 120 and generates a score 118 based on this comparison. In some implementations the generated score 118 is higher for users that submit correct answers quickly and lower for users that submit correct answers slowly. Further, in some implementations the users participating in the quiz game are ranked based on their respective scores, either for a single question or a cumulatively for the entire game.

In some implementations the transmission module 128 receives scores and rankings for one or more users from the scoring module 132 and transmits the scores 118 and rankings to the client system 102 for display. In some implementations the server system 120 includes a fact database 130. The fact database 130 receives a request from the data analysis module 124 for a fact associated with a specific keyword. The fact database 130 stores a large number of facts associated with specific words. In some implementation the fact database 130 randomly selects a fact from the list of all facts associated with the received keyword. In other implementations the fact database 130 retrieves facts for the same keyword in a specific order, to avoid repeatedly asking similar quiz questions.

Figure 2:
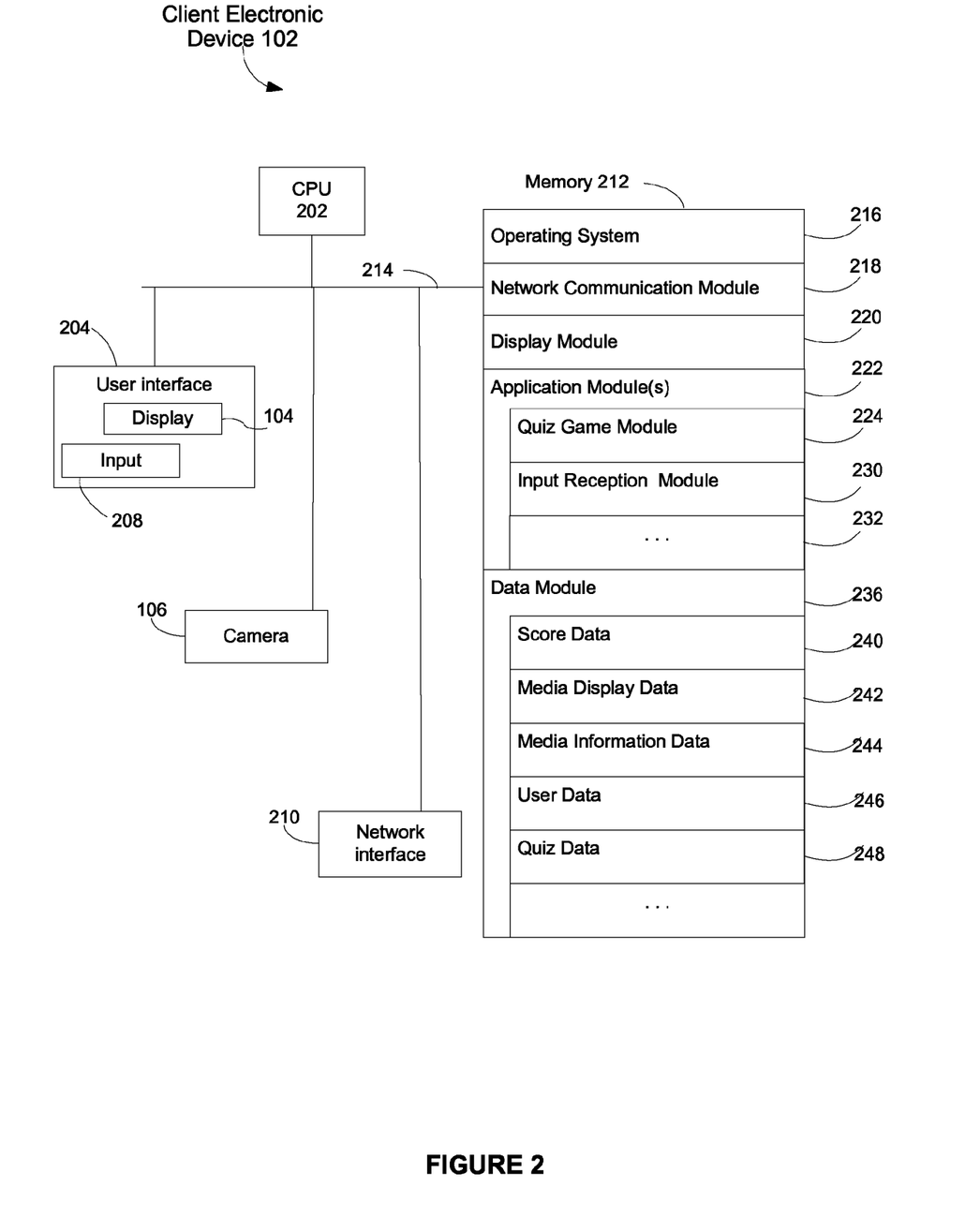
FIG. 2 is a block diagram illustrating a client system in accordance with some implementations.

FIG. 2 is a block diagram illustrating a client system 102, in accordance with some implementations. The client system 102 typically includes one or more processing units (CPU's) 202, one or more network interfaces 210, memory 212, and one or more communication buses 214 for interconnecting these components. The client system 102 includes a user interface 204. The user interface 204 includes an associated display device 104 and optionally includes an input 208 means such as a keyboard, mouse, a touch sensitive display, or other input buttons 208. In some implementations the input device 208 is a wireless device, such as a remote control. Optionally, the display device 104 includes an audio device or other information delivery device. Furthermore, some client systems 102 use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling display of media on a display 104 associated with the client system 102;
- one or more client system 102 applications module(s) 222 for enabling the client system 102 to perform the functions offered by the client system 102, including but not limited to:
  - a quiz game module 224 for transmitting media information data to a server system, receiving quiz questions, determining where on the display to display the received quiz question, and displaying scores and rankings when appropriate;
  - an input reception module 230 for receiving input from a user participating in a quiz game; and
- a data module 236 for storing data related to the client system 102, including but not limited to:
  - score data 240 including scores for one or more users on specific users for specific quiz questions, cumulative score data for the entire quiz game session, and, in some implementations, cumulative score data for a user over their entire quiz game history;
  - media display data 242 including data used to display media content on the display 104 associated with the client system 102, including data necessary for media to be displayed, data necessary to display a user interface to allow the user to effectively control the client system 102, and any other data needed to effectively use the associated display 104;

media information data 244 including the name of the piece of media content, genre information, cast information, theme or topic information, information concerning the content of specific scenes or events, and the text of all dialog spoken or displayed during a piece of media content;

user data 246 including data profiles for one or more users which tracks the users past performance and interaction with the quiz game; and quiz data 248 including generated quiz questions and potential answers received from the server data (FIG. 1, 120).

Figure 3:
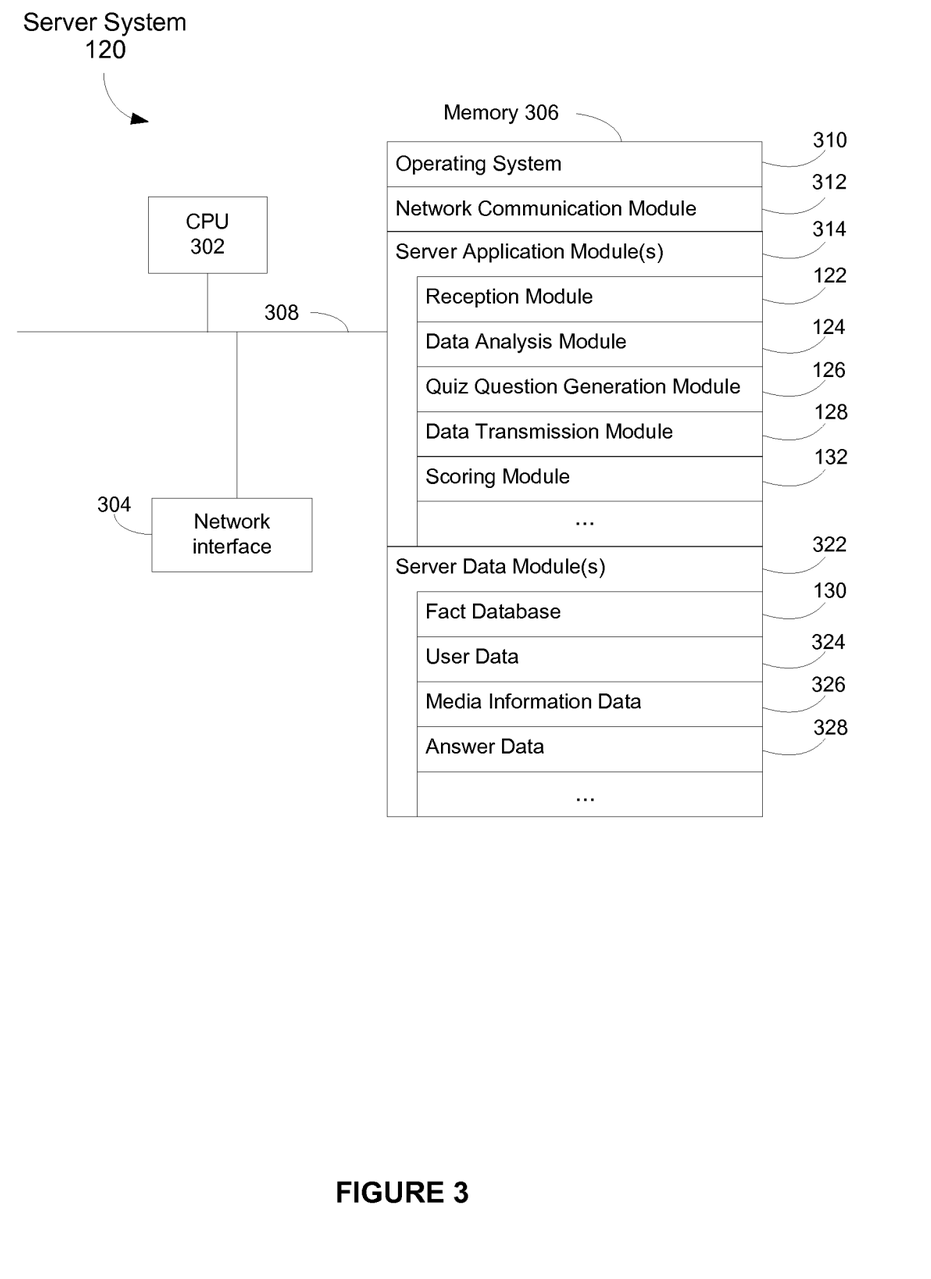
FIG. 3 is a block diagram illustrating a server system in accordance with some implementations.

FIG. 3 is a block diagram illustrating a server system 120, in accordance with some implementations. The server system 120 typically includes one or more processing units (CPU's) 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

an operating system 310 that includes procedures for handling various basic system services and for performing hardware dependent tasks;

a network communication module 312 that is used for connecting the server system 120 to other computers via the one or more communication network interfaces 304 (wired or wireless) and one or more communication networks, such as the Internet, other wide area networks, local area networks, metropolitan area networks, and so on;

one or more server application module(s) 314 for enabling the server system 120 to perform the functions offered by the server system 120, including but not limited to:

a reception module 122 for receiving data from a plurality of client systems (FIG. 1, 102) including media information data and scoring data and then passing that data to the correct processing module in the server system 120;

a data analysis module 124 for analyzing the media information data 326 received from the reception module 122 to determine one or more relevant keywords associated with the received media information data 326 and then requesting and receiving a fact associated with the key word from the fact database 130;

a quiz question generation module 126 for automatically generating a quiz question based on the fact received from the data analysis module 124;

a data transmission module 128 for sending generated quiz questions (FIG. 1, 116) and scoring/ranking data (FIG. 1, 118) a plurality of client systems (FIG. 1, 102); and a scoring module 132 for generating a score for a respective user by comparing the respective users selected answer for a give quiz question against the answer stored on the server system, wherein a higher score is given for a matching answer; and an event selection module 318 for determining a list of events to send to the client system (FIG. 1, 102) based on the media determined to be displayed on the display (FIG. 1, 104) associated with the client electronic display (FIG. 1, 102) and the information stored in the media information database 130; and one or more server data module(s) 322 for storing data related to the server system 120, including but not limited to:

a fact database 130 including specific facts associated with keywords or concepts;

user data 324 including information concerning users of the client system (FIG. 1, 102) such as a user profile, past user answers, scores, and ranking, and other information relevant to effectively providing services to the user;

media information data 326 including the name of the piece of media content, genre information, cast information, theme or topic information, information concerning the content of specific scenes or events, and the text of all dialog spoken or displayed during a piece of media content; and answer data 328 including data received from the client system (FIG. 1, 102) indicating user selected answers to specific questions.

Figure 4:
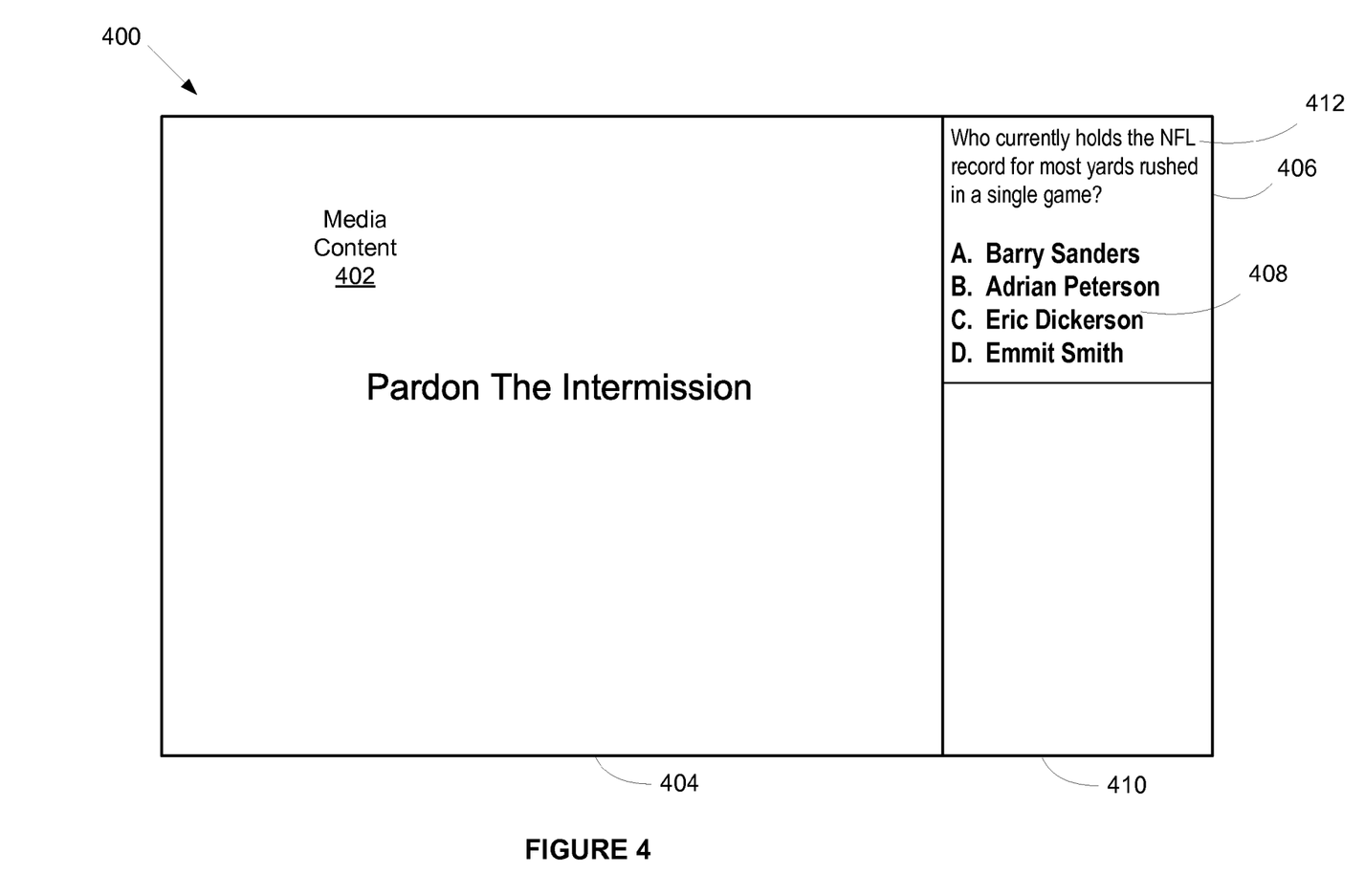
FIG. 4 depicts a user interface in accordance with some implementations.

FIG. 4 depicts a user interface in accordance with some implementations. In this example, the user interface 400 includes a media content display area 404 for displaying media content 402. The user interface 400 further includes a quiz question display area 410 in a sidebar which is displayed proximate to the media content display area 404. This quiz question display area 410 displays generated quiz questions 406 received from the server system (FIG. 1, 120). Each quiz question includes the text of the question 412 and a list of possible answers 408. In some implementations a user directly selects one of the possible answers 408 with an input device (such as a mouse, remote control, video game controller, or mobile phone.) In some implementations, once an answer has been selected by all the users in the client environment (FIG. 1, 108) the one or more answers are sent to the server system (FIG. 1, 120), the displayed question disappears, and a new question is displayed. In other implementations the quiz questions are displayed for a predetermined amount of time and, after the predetermined amount of time has ended, the current quiz question 406 is removed from display and a new question is displayed.

Figure 5:
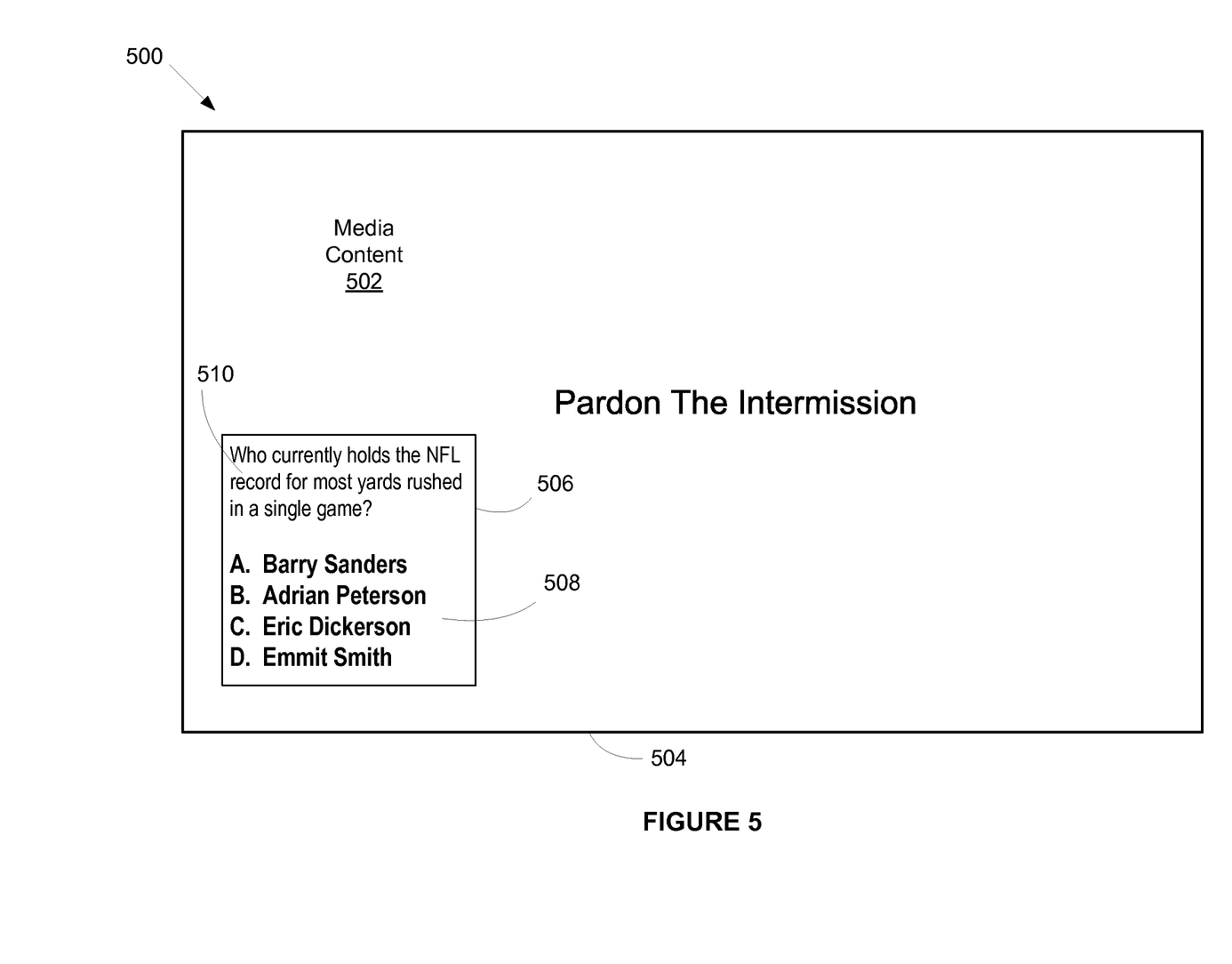
FIG. 5 depicts a user interface in accordance with some implementations.

FIG. 5 depicts a user interface in accordance with some implementations. In this example, the user interface 500 includes a content display area 504 for displaying media content 502. The user interface 500 further includes a quiz question display area 506, wherein the quiz question display area 506 is overlaid on top of the displayed media content. In some implementations, the client system (FIG. 1, 102) determines acceptable locations on the display (FIG. 1, 104) to display the quiz question display area 506. This quiz question display area 506 displays generated quiz questions received from the server system (FIG. 1, 120). Each quiz question includes the text of the question 510 and a list of possible answers 508. In some implementations a user directly selects one of the possible answers 508 with an input device (such as a mouse, remote control, video game controller, or mobile phone.) In some implementations, once an answer has been selected by all the users in the client environment (FIG. 1, 108) the one or more answers are sent to the server system (FIG. 1, 120) and the displayed question disappears and a new question is displayed. In other implementations the quiz questions are displayed for a predetermined amount of time and, after the predetermined amount of time has ended, the current quiz question is removed from display and a new question is displayed.

Figure 6:
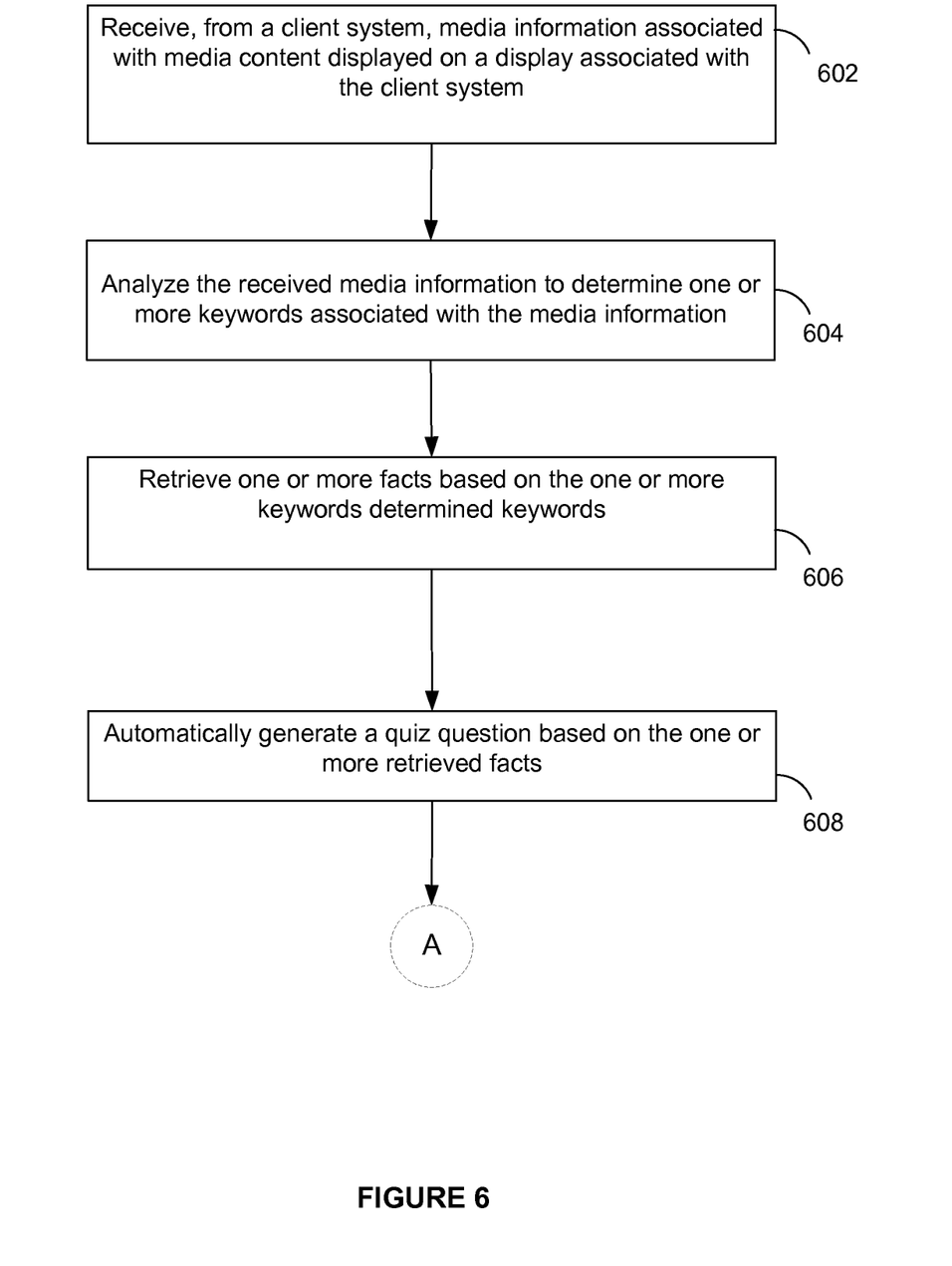
FIG. 6 is a flow diagram illustrating the process of generating quiz questions in accordance with some implementations.

FIG. 6 is a flow diagram illustrating the process of generating quiz questions, in accordance with some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the server system (FIG. 1, 120).

In accordance with some implementations, the server system (FIG. 1, 120) receives, from the client system (FIG. 1, 102), media information associated with media content displayed on a display associated with the client system (FIG. 1, 120) (602). In some implementations the server system (FIG. 120) analyzes the received media information to determine one or more keywords associated with the media information (604). The server system retrieves one or more facts based on the one or more determined keywords (606). In some implementations the server system (FIG. 1, 120) retrieves the one or more facts from a fact database (FIG. 1, 130). In some implementations the fact database (FIG. 1, 130) is maintained as part of the server system (FIG. 1, 120). In other implementations, the fact database (FIG. 1, 130) is maintained by a third party, is distinct from the server system (FIG. 1, 120), and is only accessible to the server system (FIG. 1, 120) over a communication network (FIG. 1, 110).

In accordance with some implementations, the server system (FIG. 1, 120) automatically generates a quiz question based on the one or more retrieved facts (608). The server system (FIG. 1, 124) then generates a quiz question from a fact by identifying a portion of the determined to be the answer to the quiz question. In some implementations, all facts retrieved from the fact database (FIG. 1, 130) have pre-designated answers. For example, some facts may be formatted as follows: "Napoleon Bonaparte: Emperor of the French from 1804 to 1815." In this example, the portion of the fact on the left side of the colon is already designated as the answer. In other implementations, the server system (FIG. 1, 120) determines the portion of the fact to designate as the answer based on raw facts without a pre-designated answer.

In some implementation, the server system (FIG. 1, 120) determines reasonable alternatives to the determined answer. For example, if the determined answer was "Pineapple," reasonable alternatives might be "Coconut," "Kiwi," and "Orange." The server system (FIG. 1, 120) determines reasonable alternatives by searching a database to identify alternatives to the answer. In some implementations the answer and its alternatives are randomly ordered before being sent to the client system (FIG. 1, 102).

Figure 7:
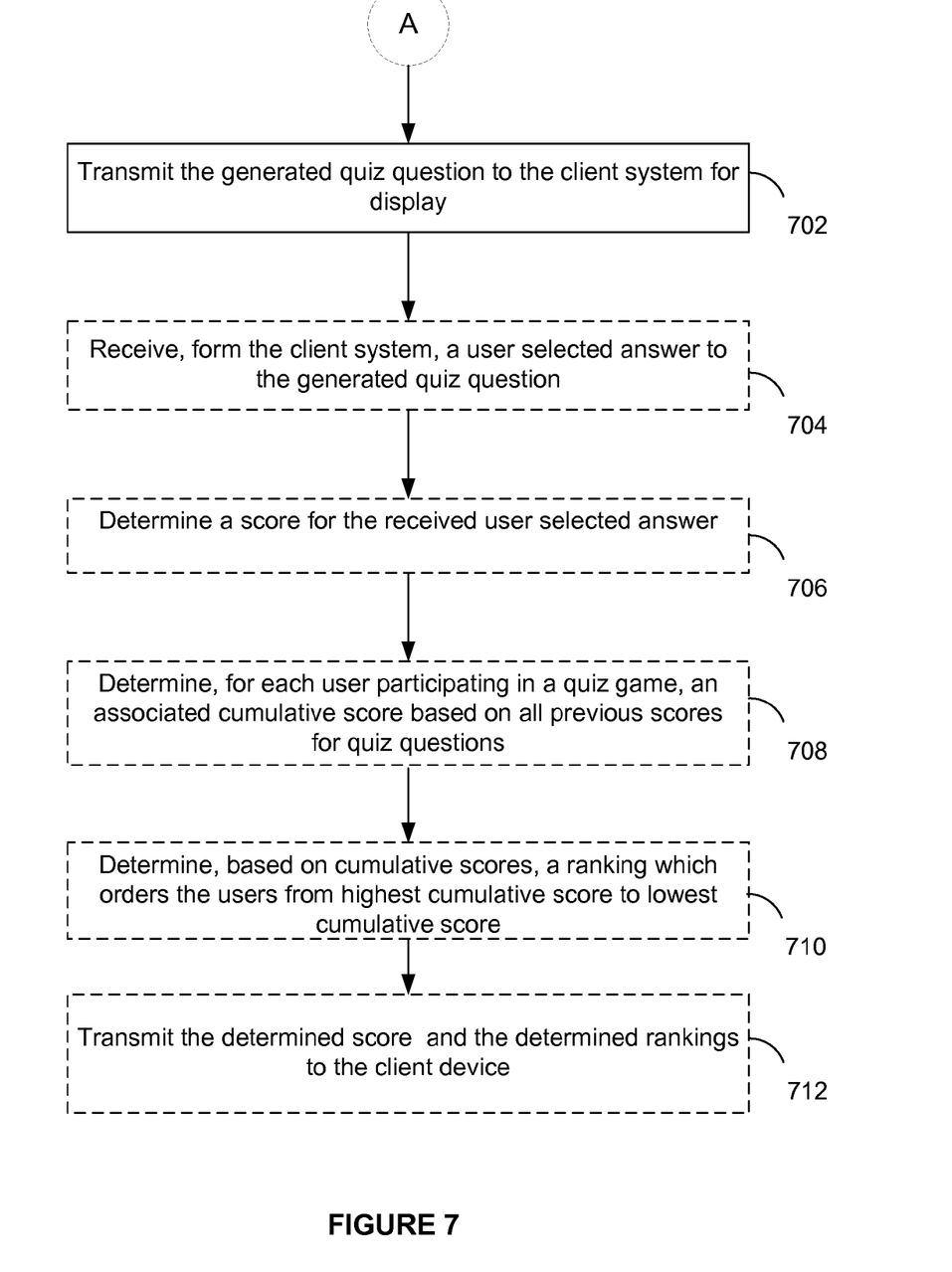
FIG. 7 is a flow diagram illustrating the process of generating quiz questions in accordance with some implementations.

FIG. 7 is a flow diagram illustrating the process of generating quiz questions, in accordance with some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 7 is performed by the server system (FIG. 1, 102).

In some implementations, the server system (FIG. 1, 120) sends the generated quiz question to the client system (FIG. 1, 102) for display (702). The server system (FIG. 1, 120) then receives a user selected answer to the generated quiz question from the client system (FIG. 1, 102) (704). The server system (FIG. 1, 120) then determines a score for the received user selected answer (706). In some implementations the score is determined by comparing the received user selected answer against the stored answer on the server system (FIG. 1, 120). A higher score is awarded for user selected answers which match the stored answer (the correct answer) than for user selected answers that do not match the stored/correct answer. In some implementations, users will also receive a higher score for selecting the correct answer quickly. For example, a user who selects the correct answer 5 seconds after the generated quiz question first being displayed would receive more points than a user who selects the correct answer 10 seconds the generated quiz question is first displayed. The server system (FIG. 1, 120) then sends the determined score to the client system (FIG. 1, 102) for display (712).

In some implementations, the server system (FIG. 1, 120) determines, for each user participating in a quiz game, an associated cumulative score based on all scores for previous quiz questions (708). The server system (FIG. 1, 120) then determines, based on the cumulative scores, a ranking for each user that orders the users from highest cumulative score to lowest cumulative score (710). The server system (FIG. 1, 120) then transmits the determined rankings to the client system for display (FIG. 1, 102) (712).

Figure 8:
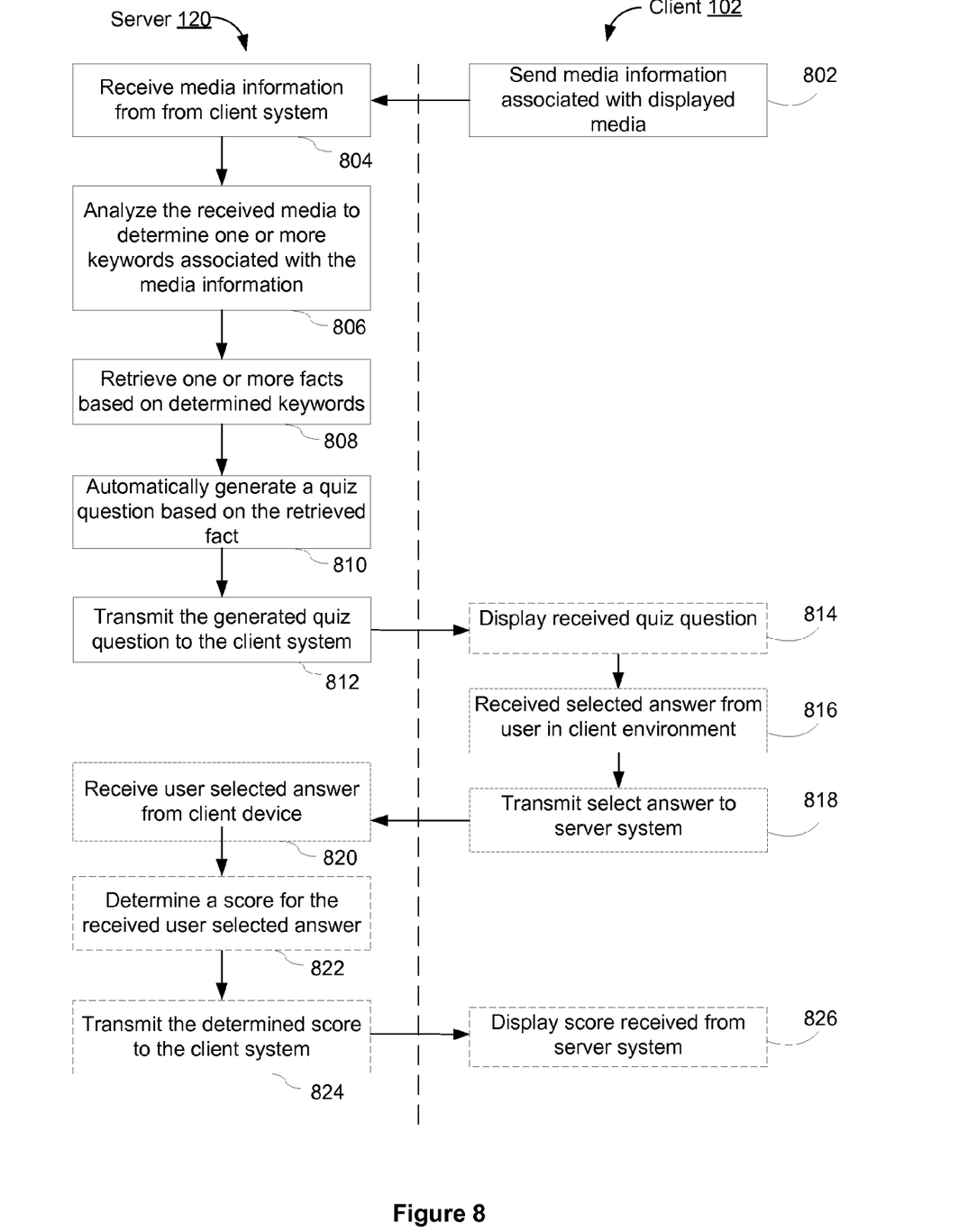
FIG. 8 is a flow diagram illustrating the communication between a client system and a server system in accordance with some implementations Like reference numerals refer to corresponding parts throughout the drawings.

FIG. 8 is a flow diagram illustrating the communication between a client system (FIG. 1, 102) and a server system (FIG. 1, 120) in accordance with some implementations. Each of the operations shown in FIG. 8 may correspond to instructions stored in a computer memory or computer readable storage medium. Optional operations are indicated by dashed lines (e.g., boxes with dashed-line borders).

In accordance with some implementations, the client system (FIG. 1, 102) sends media information associated with displayed media (802). The server system (FIG. 1, 120) receives media information from the client system (Figure, 102) (804). The server system (FIG. 1, 120) analyzes the received media to determine one or more keywords associated with the media information (806). The server system (FIG. 1, 120) retrieves one or more facts based on the retrieved keywords (808). The server system (FIG. 1, 120) automatically generates a quiz question based on the retrieved fact (810). The server system (FIG. 1, 120) then transmits the generated quiz question to the client system (FIG. 1, 102) for display (812).

In accordance with some implementations, the client system (FIG. 1, 102) displays the received question (814). The client system (FIG. 1, 102) receives a selected answer from one or more users in the client environment (FIG. 1, 108) (816). In some implementations the user answers are received from users in the client environment (FIG. 1, 108) through a wireless communication device such as a remote control or an application on the user's smart phone. The client system (FIG. 1, 102) then transmits the user selected answers to the server system (FIG. 1, 120) (818).

In accordance with some implementations, the server system (FIG. 1, 120) receives one or more user selected answers from a client system (FIG. 1, 102) (820). The server system (FIG. 1, 120) then determines a score for each received user selected answer (822). In some implementations, the score is determined such that answers which match the correct answer that is stored on the server system (FIG. 1, 120) will receive a higher score than answers that do not match the correct answer. The server system 120 then transmits the scores to the client system 102 (824). The client system 102 then displays the received scores on a display (FIG. 1, 104) associated with the client system 102 (826)

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method for automatically generating quiz questions, comprising:
    on a server system having one or more processors and memory storing one or more programs for execution by the one or more processors:
        receiving, from a client system, media information associated with video content that is currently displayed on a display associated with the client system, wherein the media information includes metadata identifying the video content;
        automatically and without user intervention:
            analyzing by the server the received media information associated with the currently displayed video content to determine one or more keywords associated with the currently displayed video content;
            retrieving by the server one or more facts from a database of facts based on the one or more determined keywords;
            generating by the server a quiz question based on the one or more retrieved facts, including
                breaking the one or more retrieved facts into a plurality of portions,
                identifying a category for each portion, and
                selecting one of the plurality of portions based on the respective category of each portion for generating the quiz question and an answer for the quiz question,
                wherein each portion of the one or more retrieved facts is a single word, a short phrase, a number, or a date, and the quiz question is generated for concurrent display with the currently displayed video content on the display associated with the client system;
        determining alternatives to the answer for the quiz question;
        arranging the answer for the quiz question and the alternatives to the answer in a randomized order; and
        transmitting the generated quiz question, the answer and the alternatives to the client system, for concurrent display with the currently displayed video content, wherein the answer and the alternatives are displayed in the randomized order.

2. The method of claim 1, wherein the media information further includes a text-based record of all dialogue spoken or displayed during the piece of video content.

3. The method of claim 1, wherein the client device is configured to display the quiz question, the answer and the alternatives in a quiz question display area that is overlaid on top of the media content currently displayed on a display associated with the client system, and the answer and the alternatives to the answer are displayed according to the randomized order.

4. The method of claim 1 further comprising:
    receiving, from the client system, a user selected answer to the generated quiz question;
    determining a score for the received user selected answer; and
    transmitting the determined score to the client device.

5. The method of claim 4, further comprising:
    determining, for each user participating in a quiz game, an associated cumulative score based on all previous scores;
    determining, based on cumulative scores, a ranking which orders the users from highest cumulative score to lowest cumulative score; and
    transmitting the determined rankings to a client system for display.

6. The method of claim 1 wherein the fact database is a third party database distinct from the server system.

7. A server system for automatically generating quiz questions, comprising:
    one or more processors; and
    memory storing one or more programs to be executed by the one or more processors;
    the one or more programs comprising instructions for:
        receiving, from a client system, media information associated with video content that is currently displayed on a display associated with the client system, wherein the media information includes metadata identifying the video content;
        automatically and without user intervention:
            analyzing by the server the received media information associated with the currently displayed video content to determine one or more keywords associated with the currently displayed video content;
retrieving by the server one or more facts from a database of facts based on the one or more determined keywords;
generating by the server a quiz question based on the one or more retrieved facts, including
breaking the one or more retrieved facts into a plurality of portions,
identifying a category for each portion, and
selecting one of the plurality of portions based on the respective category of each portion for generating the quiz question and an answer for the quiz question,
wherein each portion of the one or more retrieved facts is a single word, a short phrase, a number, or a date, and the quiz question is generated for concurrent display with the currently displayed video content on the display associated with the client system;
determining alternatives to the answer for the quiz question;
arranging the answer for the quiz question and the alternatives to the answer in a randomized order; and
after generating the quiz question related to the currently displayed video content, transmitting the generated quiz question, the answer and the alternatives to the client system for concurrent display with the currently displayed video content.

8. The server system of claim 7, wherein the media information further includes a text-based record of all dialogue spoken or displayed during the piece of video content.

9. The server system of claim 7 wherein the client device is configured to display the quiz question, the answer and the alternatives in a quiz question display area that is overlaid on top of the media content currently displayed on a display associated with the client system, and the answer and the alternatives to the answer are displayed according to the randomized order.

10. The server system of claim 7, wherein the one or more programs further comprise instructions for:
receiving, from the client system, a user selected answer to the generated quiz question;
determining a score for the received user selected answer; and
transmitting the determined score to the client device.

11. The server system of claim 10, wherein the one or more programs further comprise instructions for:
determining, for each user participating in a quiz game with an associated cumulative score, a ranking which orders the users from highest cumulative score to lowest cumulative score and
transmitting the determined rankings to a client system for display.

12. The server system of claim 7, wherein the fact database is a third party database distinct from the server system.

13. A non-transitory computer readable storage medium storing one or more programs configured for execution by an server system, the one or more programs comprising instructions for:
receiving, from a client system, media information associated with video content that is currently displayed on a display associated with the client system, wherein the media information includes metadata identifying the video content;
automatically and without user intervention:
analyzing by the server the received media information associated with the currently displayed video content to determine one or more keywords associated with the currently displayed video content;
retrieving by the server one or more facts from a database of facts based on the one or more determined keywords;
generating by the server a quiz question based on the one or more retrieved facts, including
breaking the one or more retrieved facts into a plurality of portions,
identifying a category for each portion, and
selecting one of the plurality of portions based on the respective category of each portion for generating the quiz question and an answer for the quiz question,
wherein each portion of the one or more retrieved facts is a single word, a short phrase, a number, or a date, and the quiz question is generated for concurrent display with the currently displayed video content on the display associated with the client system;
determining alternatives to the answer for the quiz question;
arranging the answer for the quiz question and the alternatives to the answer in a randomized order; and
after generating the quiz question related to the currently displayed video content, transmitting the generated quiz question, the answer and the alternatives to the client system for concurrent display with the currently displayed video content.

14. The computer readable storage medium of claim 13, wherein the media information further includes a text-based record of all dialogue spoken or displayed during the piece of video content.

15. The computer readable storage medium of claim 13 wherein the client device is configured to display the quiz question, the answer and the alternatives in a quiz question display area that is overlaid on top of the media content currently displayed on a display associated with the client system, and the answer and the alternatives to the answer are displayed according to the randomized order.

16. The computer readable storage medium of claim 13, wherein the one or more programs further comprise instructions for:
receiving, from the client system, a user selected answer to the generated quiz question;
determining a score for the received user selected answer; and
transmitting the determined score to the client device.

17. The computer readable storage medium of claim 16, wherein the one or more programs further comprise instructions for:
determining, for each user participating in a quiz game with an associated cumulative score, a ranking which orders the users from highest cumulative score to lowest cumulative score and
transmitting the determined rankings to a client system for display.

18. A method for automatically generating quiz questions, comprising:
on a server system having one or more processors and memory storing one or more programs for execution by the one or more processors:
receiving, from a client system, media information associated with video content that is currently displayed on a display associated with the client system, wherein the media information includes metadata associated with the currently displayed video content;

automatically and without user intervention:
generating by the server a quiz question based on the media information associated with the currently displayed video content, wherein the quiz question is intended for concurrent display with the currently displayed video content;
determining an answer for the quiz question and alternatives to the answer for the quiz question;
arranging the answer for the quiz question and the alternatives to the answer in a randomized order; and
after generating the quiz question related to the currently displayed video content, transmitting the generated quiz question, the answer and the alternatives to the client system for concurrent display with the currently displayed video content.

* * * * *